G. L. REICHHELM.
ROTARY BLOWER.
APPLICATION FILED DEC. 1, 1906. RENEWED JAN. 30, 1911.
1,076,391.
Patented Oct. 21, 1913.
3 SHEETS—SHEET 1.
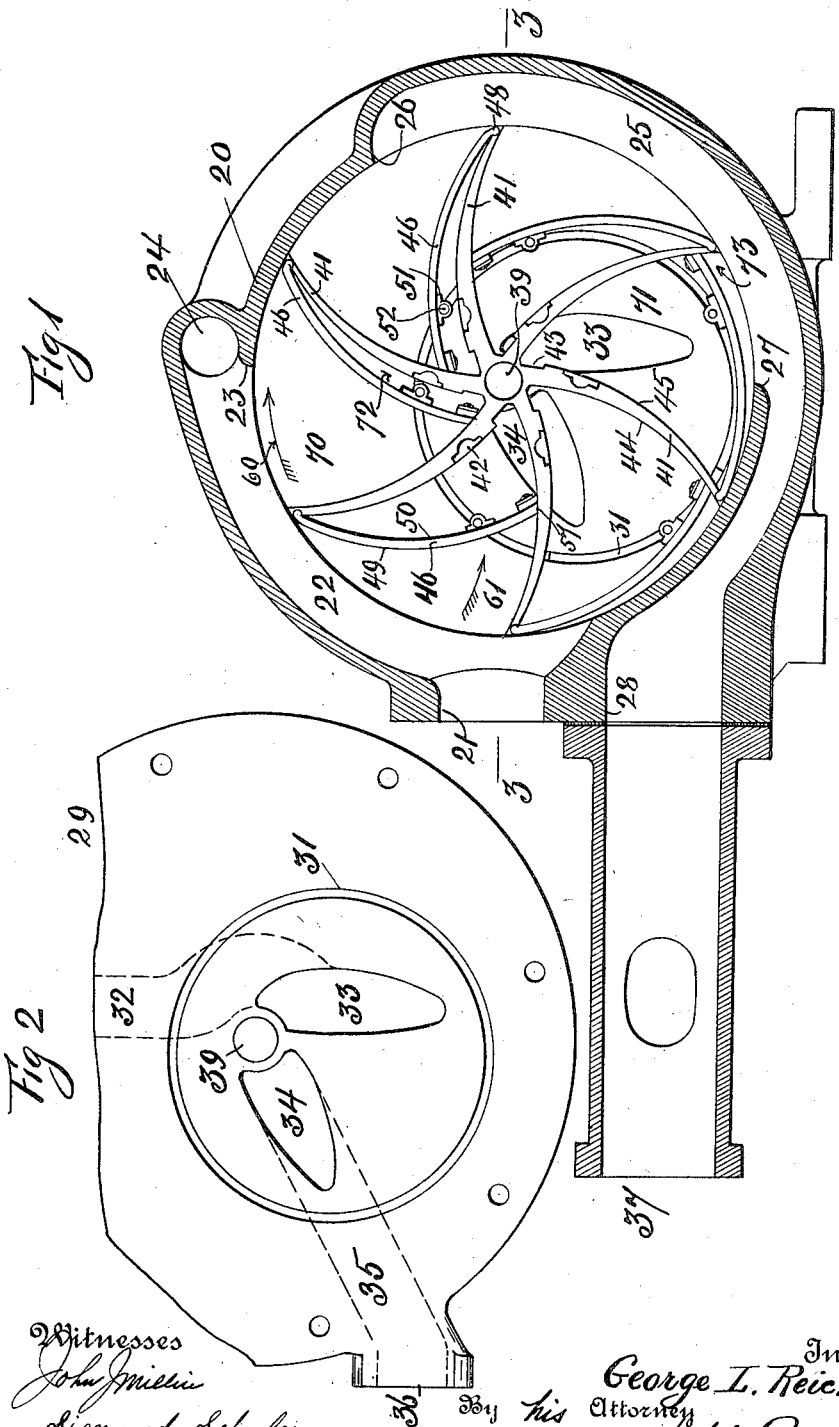

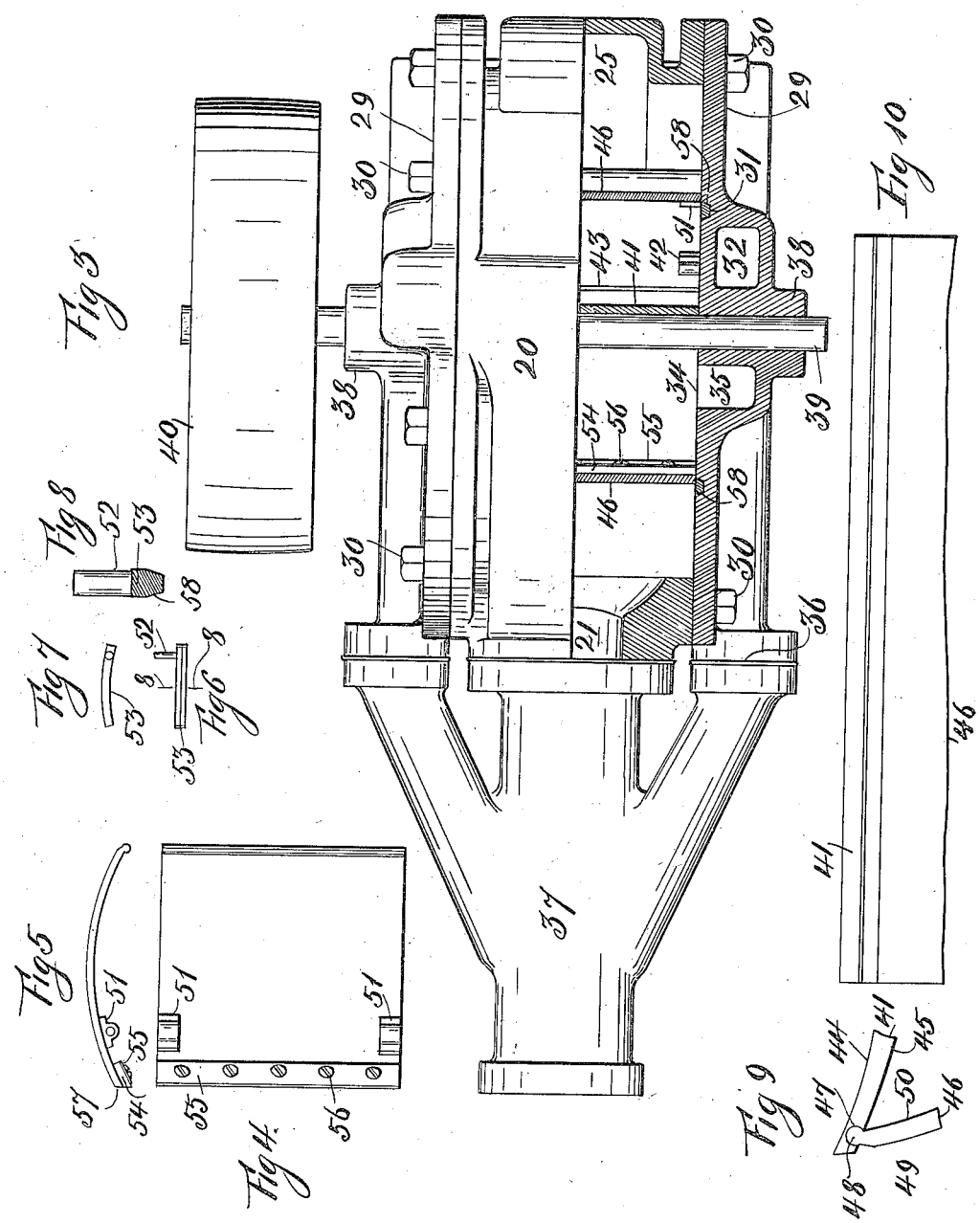

G. L. REICHHELM.
ROTARY BLOWER.
APPLICATION FILED DEC. 1, 1906. RENEWED JAN. 30, 1911.
1,076,391.
Patented Oct. 21, 1913.
3 SHEETS—SHEET 3.
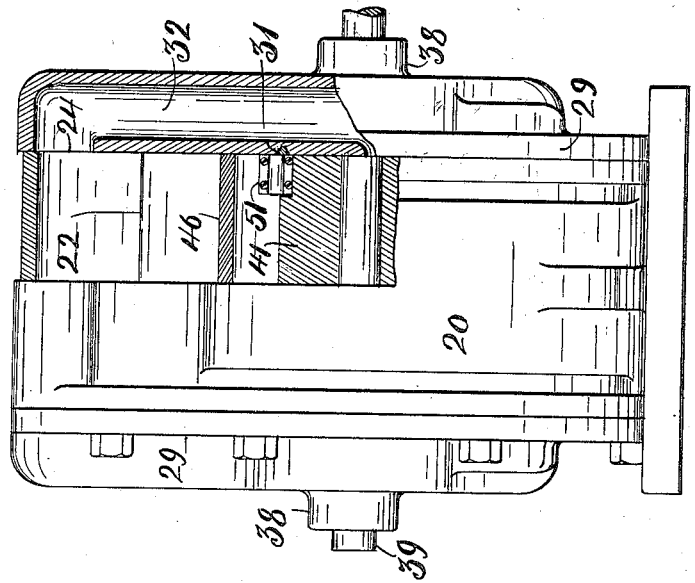
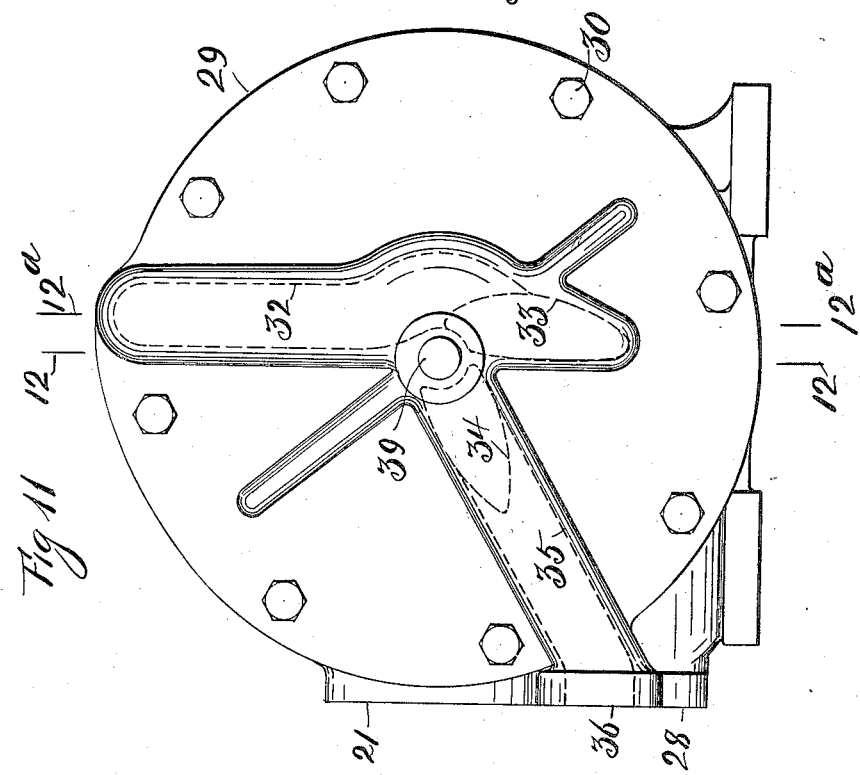
Witnesses
John Millin
Sigmund Schuler
Inventor
George L. Reichhelm
By his Attorney
A. de Bomeville

UNITED STATES PATENT OFFICE.

GEORGE L. REICHHELM, OF JERSEY CITY, NEW JERSEY, ASSIGNOR, BY MESNE ASSIGNMENTS, TO P. R. MANUFACTURING COMPANY, OF DETROIT, MICHIGAN, A CORPORATION OF MICHIGAN.

ROTARY BLOWER.

1,076,391.    Specification of Letters Patent.    Patented Oct. 21, 1913.

Application filed December 1, 1906, Serial No. 345,898. Renewed January 30, 1911. Serial No. 605,540.

*To all whom it may concern:*

Be it known that I, GEORGE L. REICHHELM, a citizen of the United States, and a resident of Jersey City, in the county of Hudson and State of New Jersey, have invented certain new and useful Improvements in Rotary Blowers, of which the following is a specification.

This invention relates to rotary blowers, and its organization comprises a cylinder with main rotating blades, to each of which latter is hinged a swinging blade, forming two independent working chambers between the main blades, one on each side of the swinging blade. By the joint action of the blades the full contents of the cylinder is charged and discharged twice during each rotation of the blower, eliminating also all losses of efficiency that would be caused by clearances. One of said chambers coacts directly with a main pair of inlet and outlet ports, and the other working chamber coacts with said ports, through the medium of secondary inlet and outlet ports, the first of these I will herein designate as a main working chamber, and the second as a secondary working chamber.

Figure 1 represents a partial vertical longitudinal section of a blower exemplifying the invention, Fig 2 shows a partial elevation of the inner face of one of the cylinder heads of the machine, Fig. 3 is a partial plan view and horizontal section of Fig. 1 on the line 3, 3, Fig. 4 represents a plan view of one of the swinging blades, Fig. 5 is a top end view of Fig. 4, Fig. 6 shows an elevation of a blade segment, Fig. 7 represents a top plan view of Fig. 6, Fig. 8 is an enlarged section of Fig. 6 on the line 8, 8, Fig. 9 shows an enlarged edge view of the joint between the blades, Fig. 10 is a side view of Fig. 9, Fig. 11 represents a partial front view of the blower, Fig. 12 represents an end view and sections of Fig. 11 on the lines 12, 12 and 12$^a$, 12$^a$.

The invention is shown to comprise a cylinder 20 with an inlet opening 21, which latter connects with a circumferental inlet port 22 open throughout its length with the inside of the cylinder and having the upper edge 23. Side outlets 24 extend from the port 22 and connect with ports in the cylinder head to be described. A circumferential outlet port 25 open throughout its length with the inside of the cylinder and having the edges 26 and 27 connects with the discharge opening 28. The openings 21 and 28 are adjacent to each other and on the same side of the cylinder. Cylinder heads 29 are bolted to the cylinder 20 with the bolts 30. Each head contains an annular groove 31, the center of which is a little to the left of a vertical line drawn through the axial center of the cylinder. Each head contains a port 32 which I will term a secondary inlet port, that connects with one of the side outlets 24 of the cylinder, and enters the cylinder at about its central portion through an opening 33, which I will term a secondary inlet opening. In each head and at about its central portion there is also formed an opening 34 termed herein a secondary outlet opening, that joins with a secondary outlet port 35 in the cylinder head, the latter leading to the secondary discharge opening 36. The discharge openings 28 and 36 are joined with an outlet nozzle 37.

In each of the cylinder heads 29 there is formed a bearing 38 for a shaft 39, the axis of which is concentric with the cylinder. A pulley 40 is carried on the said shaft. A plurality of main blades 41, preferably concaved extend from the shaft 39, and in the present case six of them are shown. The blades extend across the width of the cylinder between the heads thereof and each has the notches 42 and 43. The concaved faces 44 of the blades 41, are formed each with a radius a little smaller than half the diameter of the cylinder, and are arcs of cylinders struck from the axis of the hinge of the swinging blade on the next main blade in advance, and the convex faces 45 thereof are each formed with a radius practically equal to the radius of the cylinder.

At the outer edge of each main blade 41 there is hinged a secondary concaved swinging blade 46, the hinge preferably consisting of a circular groove 47 formed across the whole width of the blade 41, and a circular projection 48 extending across the whole width of the swinging blade 46 fits in said groove. The convex face 49 of the swinging blade is formed with a radius equal to the radius of the cylinder and the radius of its concave face 50 is equal to the radius of the convex face 45 of the blades 41. Each swinging blade 46 carries a pair of pillow blocks 51, into which are pivoted the pins 52 of the sectors 53, preferably beveled as shown at 58, that engage with the annular grooves 31, and thereby the swinging blades are held across their whole widths at the jointed ends and at both sides near their swinging ends. A packing strip 54 may be secured at the outer edge of each swinging blade with a cover plate 55 secured with screws 56. The length of each swinging blade is such that its edge 57 with the said packing strip, continuously makes a tight fitting joint with the concave face 44 of one of the main blades 41, the said edge conforming to the shape of the concave face.

To operate the invention the pulley 40 is turned in the direction of the arrow 60 by means of a belt and any source of power not shown. The charge of air, vapor or any other fluid is drawn in at the inlet opening 21 through the circumferential port 22, and into the cylinder between the walls of said port and the convex face 49 of the swinging blade which is opposite the opening 21, and the concave face 44 of the main blade with which its edge is in contact. As the said main blade passes opposite the opening 21 it induces the entrance of a charge into the cylinder, and its action is assisted by virtue of the inward movement of the swinging blade 46 on its hinge in a direction represented by the arrow 61. Considering further the action of the main blade and the swinging secondary blade hinged thereto, any fluid entrapped between the convex face of the next forward adjacent main blade and the concave face of the swinging blade, will be forced through the secondary outlet opening 34 which action will be presently described in detail. When the main blade reaches the edge 26 of the port 25 the concave face of the swinging blade is in contact with the convex face of the said main blade to which it is hinged, and the space between the swinging blade and its next following adjacent main blade is fully open. Upon the further rotation of the blade with its hinged member the latter swings up on the concave face of the next adjacent following main blade, and forces the charge into the circumferential outlet port 25 until it has traveled to the edge 27. When the swinging blade is located on the circumferential face of the cylinder, the charge between the two main blades has been completely discharged into the said exhaust port 25 on its way through the outlet nozzle 37. Upon the further rotation of the shaft 39 the swinging blade begins to travel up on the concave side of the main blade toward the center of the blower, to be in proper position to take in another charge.

While these operations are going on a secondary charge of air, vapor or other fluid is being drawn in from the main inlet port 22 through the openings 24, and from thence through the secondary inlet ports 32 and through the openings 33, between the concave face of one main blade the convex face of a main blade adjacent thereto and the concave face of one of the swinging blades, as shown in the lower portion of Fig. 1. Next when the shaft rotates the latter charge is brought opposite the outlet opening 34, and the swinging blade swinging toward the shaft will force this latter charge, through the opening 34 on its way through the secondary outlet port 35, to outlet nozzles 37 in to which it is discharged, with the main discharge from the port 22. It will be noted that the spaces between the main blades are each used twice during each revolution, and that the coaction of the blades eliminates all clearances from the cylinder.

The location of the annular grooves 31 with their axial center a little to the left of a vertical center line drawn through the shaft of the cylinder, and the locations of the pillow blocks 51 on the swinging blades 46 allows only the portions of the swinging blades between said pillow blocks and the swinging end thereof, to pass over the paths of the annular grooves, and then only over the blade sectors 53, avoiding leakage between the working chambers.

The operation of the blades is such that the fluids in the chambers between the main blades that are diametrically opposite each other balance each other. Comparing, for example, the chambers 70 and 71, the former is taking in air from the port 22, and the latter is taking air through the opening 33, the effects of the chambers balancing each other. The chamber 72 is forcing air through the opening 34 and the chamber 73 is forcing air through the port 25, the effect of the chambers balancing each other.

Having described my invention, I claim:

1. In a blower the combination of a cylinder having a main inlet and a main outlet, cylinder heads for the cylinder, a circumferential inlet port open throughout its length with the inside of the cylinder connected with said inlet, a circumferential outlet port open throughout its length with the inside of the cylinder and connected with said outlet, a secondary inlet port in each cylinder head extending from the circumferential inlet port to secondary inlet openings, a secondary outlet port in each cylinder head leading from the inside of the cylinder to secondary outlet openings, a shaft for the cylinder and concentric therewith, main blades extending from the shaft, secondary swinging blades hinged to the outer ends of the main blades, the free end of each swinging blade making contact with the next adjacent following main blade, forming a working chamber on each side of each swinging blade and between the main blades, one of said working chambers coacting directly with the main inlet and outlet openings, and the other chamber coacting with a secondary inlet and outlet.

2. In a rotary blower the combination of a cylinder having a main inlet and a main outlet opening, cylinder heads for the cylinder, a circumferential inlet port open throughout its length with the inside of the cylinder connected with said inlet, a circumferential outlet port open throughout its length with the inside of the cylinder and connected with the main outlet, a secondary inlet port in each cylinder head connecting with the circumferential inlet port and leading into the cylinder, a secondary outlet port in each cylinder head connecting the inside of the cylinder with a secondary discharge opening, a shaft in the cylinder and concentric therewith, main blades extending from the shaft, a swinging blade hinged to each main blade, blade sectors hinged to each swinging blade, annular circular grooves in the cylinder heads eccentric with the shaft of the cylinder for the blade sectors, the relations of the positions of the annular grooves and the joints on the swinging blades for the blade sectors being such, that the portion of each swinging blade between the joint of the blade sector and the hinge with the main blade, never crosses the annular groove during the rotations of the shaft of the blower.

3. In a rotary blower the combination of a cylinder having a main inlet and a main outlet opening, cylinder heads for the cylinder, a circumferential inlet port open throughout its length with the inside of the cylinder connected with said inlet, a circumferential outlet port open throughout its length with the inside of the cylinder and connected with the main outlet, a secondary inlet port in each cylinder head connecting with the circumferential inlet port and leading into the cylinder, a secondary outlet port in each cylinder head connecting the inside of the cylinder with a secondary discharge opening, a shaft in the cylinder and concentric therewith, main blades extending from the shaft, and a secondary swinging blade extending from each main blade, forming with the main blades a working chamber on each side of each swinging blade.

4. In a device of the character described, the combination with a cylinder having inlet and outlet ports, of a plurality of main rotating blades, means for rotating said blades, a plurality of secondary blades rotating with but movable relatively to said main blades, means for reciprocating said secondary blades relatively to the main blades during the rotation of the main blades, and means for connecting each of the spaces between said main and secondary blades alternately with the inlet and outlet ports, whereby the entire cubical contents of the cylinder is discharged twice during each revolution of said main blades.

5. The combination with a cylinder having inlet and outlet ports, of a rotary shaft concentrically located within said cylinder, main blades extending radially from said shaft, secondary swinging blades hinged to said main blades, and means for connecting the opposite sides of each swinging blade alternately with the inlet and outlet ports, whereby working chambers are simultaneously formed on the opposite sides of each swinging blade.

6. The combination with a cylinder having inlet and outlet ports, of a rotary shaft concentrically located within said cylinder, cylinder heads having corresponding angular grooves eccentric with respect to said shaft, main blades extending radially from said shaft, secondary swinging blades hinged to the main blades, means on the opposite edges of each secondary blade engaging said grooves in the cylinder heads, means for rotating said shaft, and means for constantly connecting each of the chambers on the opposite sides of each swinging blade alternately with the inlet and outlet ports, whereby working chambers are formed simultaneously on the opposite sides of each swinging blade.

7. In a device of the character described, the combination with a cylinder having inlet and outlet ports, of a plurality of relatively fixed radial blades in said cylinder, means for rotating said blades, a plurality of movable blades intermediate of said radial blades, means for rotating such radial blades, means for automatically reciprocating said movable blades during the rotation of the radial blades, and means for substantially constantly connecting the opposite sides of each swinging blade alternately with the inlet and outlet ports, whereby working chambers are simultaneously formed on the opposite sides of each swinging blade.

8. In a device of the character described, the combination with a cylinder having inlet and outlet ports, of a concentric rotary shaft within said cylinder, curved main blades extending radially from said shaft, correspondingly curved secondary swinging blades pivotally connected with the outer ends of the main blades, the path of the free edges of the swinging blades conforming to the curvature of the adjacent following main blades, means for automatically oscillating the secondary blades during their rotation with the main blades, and means for constantly connecting the opposite sides of each swinging blade alternately with the inlet and outlet ports, whereby working chambers are simultaneously formed on the opposite sides of each swinging blade.

Signed at the borough of Manhattan in the county of New York and State of New York this 23d day of November A. D. 1906.

GEORGE L. REICHHELM.

Witnesses:
M. H. COOK,
JOHN J. MILLIN.

Copies of this patent may be obtained for five cents each, by addressing the "Commissioner of Patents, Washington, D. C."